(12) United States Patent
Tolpin

(10) Patent No.: US 7,024,621 B1
(45) Date of Patent: Apr. 4, 2006

(54) METHODS AND SYSTEMS FOR RENDERING ELECTRONIC DATA

(75) Inventor: David Tolpin, Yerevan (AM)

(73) Assignee: RenderX, Palo Alto, CA (US)

( * ) Notice: Subject to any disclaimer, the term of this patent is extended or adjusted under 35 U.S.C. 154(b) by 800 days.

(21) Appl. No.: 09/699,806

(22) Filed: Oct. 30, 2000

Related U.S. Application Data

(60) Provisional application No. 60/203,809, filed on May 19, 2000.

(51) Int. Cl.
*G06F 17/24* (2006.01)

(52) U.S. Cl. ........................ 715/517; 715/513
(58) Field of Classification Search ............... 715/517, 715/513, 509; 345/805
See application file for complete search history.

(56) References Cited

U.S. PATENT DOCUMENTS

| | | | | |
|---|---|---|---|---|
| 4,503,515 A | 3/1985 | Cuan et al. | | 715/537 |
| 4,648,067 A | 3/1987 | Repass et al. | | 715/537 |
| 5,097,418 A | 3/1992 | Nurse et al. | | 715/537 |
| 5,111,397 A | 5/1992 | Chirokas et al. | | 364/419 |
| 5,323,312 A | 6/1994 | Saito et al. | | |
| 5,420,695 A | 5/1995 | Ohta | | 358/462 |
| 5,438,512 A | 8/1995 | Mantha et al. | | |
| 5,450,536 A | 9/1995 | Rosenberg et al. | | 395/148 |
| 5,475,805 A | 12/1995 | Murata | | |
| 5,495,561 A | 2/1996 | Holt | | 395/114 |
| 5,553,217 A | 9/1996 | Hart et al. | | |
| 5,600,771 A | 2/1997 | Hayashi et al. | | |
| 5,633,996 A | 5/1997 | Hayashi et al. | | |
| 5,845,299 A * | 12/1998 | Arora et al. | | 715/513 |
| 5,860,073 A | 1/1999 | Ferrel et al. | | 715/522 |
| 5,870,770 A * | 2/1999 | Wolfe | | 345/805 |
| 5,883,635 A | 3/1999 | Rao et al. | | 345/440 |
| 5,893,127 A * | 4/1999 | Tyan et al. | | 715/513 |
| 5,895,477 A | 4/1999 | Orr et al. | | 707/517 |
| 6,012,098 A | 1/2000 | Bayeh et al. | | |
| 6,031,989 A | 2/2000 | Cordell | | |
| 6,088,708 A * | 7/2000 | Burch et al. | | 715/509 |

(Continued)

FOREIGN PATENT DOCUMENTS

EP 0094546 11/1983

(Continued)

OTHER PUBLICATIONS http://www.phptr.com/articles/article.asp?p=101622, as it appeared on Oct. 24, 2003.*

*Primary Examiner*—Doug Hutton
(74) *Attorney, Agent, or Firm*—Schwegman, Lundberg, Woessner & Kluth, P.A.

(57) ABSTRACT

Methods and a system are provided to receive electronic data in their native format and to deliver automatically revised electronic data in a new format and new layout. The received data are decomposed into their constituent parts including text and floating objects, geometric rectangles are generated to house the objects where like object rectangles are linked together creating a path for object insertion onto the rendered page.

Moreover, a method of electronically providing for a footnote body on an electronic page is provided wherein page objects are received having reference and body objects. A body area is generated at the bottom of a page to house the body objects while a reference area is generated above the body area to house the reference objects. The areas are represented as geometric rectangles, and the body area is expanded to accommodate an additional body object while the reference are is correspondingly decreased maintaining the overall area associated with the page.

19 Claims, 10 Drawing Sheets

U.S. PATENT DOCUMENTS

| | | | |
|---|---|---|---|
| 6,230,170 B1 | 5/2001 | Zellweger et al. | 715/512 |
| 6,292,809 B1 | 9/2001 | Edelman | 715/503 |
| 6,415,305 B1 | 7/2002 | Agrawal et al. | 715/503 |
| 6,584,476 B1 | 6/2003 | Chatterjee et al. | |
| 6,613,099 B1 | 9/2003 | Crim | 715/523 |
| 6,661,919 B1 | 12/2003 | Nicholson et al. | 382/173 |
| 6,694,487 B1 | 2/2004 | Ilsar | 715/527 |
| 2002/0069221 A1 | 6/2002 | Rao et al. | 715/509 |

FOREIGN PATENT DOCUMENTS

EP        0398477        11/1990

\* cited by examiner

METHODS AND SYSTEMS FOR RENDERING ELECTRONIC DATA

This application claims priority from U.S. Provisional 60/203,809 filed May 19, 2000, the disclosure of which is incorporated herein by reference.

FIELD OF THE INVENTION

The present invention relates to methods and systems for rendering electronic data and delivering the data in a variety of layouts and formats.

BACKGROUND OF THE INVENTION

The standardization of communication protocols and data formats have permitted the World-Wide Web (WWW) and the Internet to revolutionize the manner in which electronic communications occur. Web browsers (equipped with the appropriate external viewer plugins) such as Internet Explorer, Netscape, and the like facilitate the viewing of various data formats on display screens. Further, external viewers such as Adobe Acrobat and the like, may facilitate viewing data formats on display screens independent of web browsers. Moreover, there are a variety of data formats not directed to viewing data directly on a display screen but, rather, directed to formatting electronic data prior to delivering the data to another device (e.g. printer, and the like). Additionally, a variety of translation or software languages permit data formats to be converted from one data format to another, or permit data formats to be enhanced in some way by altering the presentation of the data when displayed. Some of these translation languages and data formats include by way of example only, Hypertext Markup Language (HTML), PostScript (PS), Portable Document Format (PDF), Standard Generalized Markup Language (SGML), Printer Control Language (PCL), Extended Markup Language (XML), Extended Stylesheets Language (XSL), Wireless Markup Language (WML), and the like.

Furthermore, a wide variety of data formats permits defining non-text data types, these data type definitions allow viewing graphics, images, video, audio (listening), and the like. Recently, many viewers (made operable with traditional browser via plugins) have been developed to permit the displaying of data formats on any communications device, such as wireless phones, hand-held computing devices, car computing devices, appliances, stand alone printers, digital video, digital cameras, and the like.

Recent industry consortiums have attempted to further revolutionize the area of data delivery and presentation by creating an industry data format from XML which divorces data content descriptions from data presentation layouts. In other words, XML is an open industry standard for defining and separating the data content from the data presentation. Such a standard permits more efficient electronic communications and transactions, by permitting users to transmit data back and forth even while each user potentially views the data in entirely different data formats, with customized data presentation layouts distinct for each user.

For example, a local user having a data viewer that does not support a PDF data format but, rather, a MICROSOFT WORD data format receives a data transmission in XML data format from a remote user. The remote user's data are stored in an XML data format and used by the remote user in a PDF data viewer, by using a translator which presents the XML data to the remote user in a PDF data format compatible with the PDF data viewer. When the remote user sends these data to the local user, the XML data format is sent and not the PDF data format. The local user receives the XML data format and translates it to MICROSOFT WORD compatible with the local user's data viewer. In this way, disparate viewing data formats become transparent to the users, who use his/her own viewing data formats.

Moreover, these data formats have translators/parsers which permit data to be delivered in a variety of presentation (layout) formats on display devices. For example, Extended Stylesheets Language Transformations (XSLT) permits easy manipulation of XML documents to create a wide variety of customizable layout styles and data presentations.

Yet, manipulating data formats and customizing document layouts for display devices, printing devices, and other devices are problematic because often a document needs to populate a specific output layout and, therefore, providing this layout for a wide variety of disparate data types such as text, graphics, images, footnotes, audio, video and the like, generates a significant amount of data presentation errors. The result is that although a data format was translated from one format to a format useable by a requesting user, the resulting display of that translated data is of almost of no value to the requesting user because the translator used to provide the layout could not adequately address how disparate data types co-exist on the rendered electronic media. These complex layouts are often somewhat better handled by batch programming utilities which can store and better calculate how a document layout is to appear when being translated from one format to another format. Yet, even these batch programming utilities still largely perform canned operations which result in the layout or presentation of the translated data being largely corrupted from the original data format.

SUMMARY OF THE INVENTION

Accordingly, an object of the invention is to provide methods and a system for rendering data in a user defined output format regardless of the complex data layouts required. Moreover, the data rendering may be performed in stream as opposed to in batch mode resulting in improved performance and efficiency. This permits users to truly realize the benefits of seamlessly translate between multiple data formats without a loss in presentation or performance during the translations.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods and a system are provided for rendering electronic data.

A method of electronically rendering data on a computer readable medium is provided, comprising receiving one or more data objects including text objects and floating objects generating floating areas to house the floating objects. The floating areas are outputted at predetermined locations and textual areas are generated to house the text objects, these textual areas comprising an outputted area where the floating areas have been removed, the text objects are then output adjacent to the floating areas.

Moreover, a system for electronically rendering data on a computer readable medium is provided, comprising one or more text objects, one or more floating objects, and a set of executable instructions operable to create and output data by dividing from input data a set of textual areas and a set of floating areas and operable to populate the textual areas with the text objects and the floating areas with the floating objects.

Further, a method of electronically providing a footnote body on a page in a computer readable medium is provided, comprising identifying one or more page objects including reference objects and body objects, generating a body area located at the bottom of a page to house the body objects and generating a reference area located above the body area to house the reference objects. Next, geometric rectangles are formed to house the reference and body areas such that the body area is expanded to accommodate an additional body object while the reference area is decreased and an overall area associated with the page remains constant.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

The present invention provides methods and a system which the rendering of electronic data. One embodiment of the present invention is implemented using web browser technologies including well-known software programming languages (e.g., C, C++, Java, Active X, Active Server Pages, XSLT, Xpath) and Internet communication protocols (TCP/IP). Of course other programming languages and communications protocols (now known or hereafter developed) may be also readily employed.

Electronic data may be logically represented as one or more electronic pages for purposes of presenting these data in specific layouts. In this sense, the page defines a logical area in these electronic data. Moreover, since a page is a logical area associated with these electronic data, the page is adjustable such that the entire electronic data could be viewed as a single electronic page, or conversely the entire electronic data could be viewed as multiple electronic pages.

As one skilled in the art will readily appreciate, electronic data may be conceptually viewed in a variety of ways such as documents, pages, lines, paragraphs, and other ways. Correspondingly, as used herein the term "page" and "electronic data" are used interchangeably and intended to include the broadest possible meaning.

Accordingly, data which are to be rendered have an output layout which defines their presentations after having been rendered. These data are decomposed into their constituent types, where floating objects (non-text data types such as graphics, images, video, footnote bodies, and the like) and text objects (text data types such as tables, character text, and the like) are separated.

Initially, the rendered data represent a single rectangle occupying all the text objects contained within the original electronic data (non rendered format). Next, areas within the rendered data, where the floating objects are to reside are defined by geometric rectangles which enclose the floating objects, these areas are linked together to form a linked list, the traversal of the list is defined as the floating object path. These rectangular areas are subtracted from the initial single rectangle, and the remaining area is constructed as a series of rectangles adjacent to the floating object rectangles. These remaining rectangles are linked together to form a list, the traversal of this list is defined as the text object path.

Finally, the text objects are sequentially inserted into the rectangular areas designed to house the text objects beginning at the head of the text object list, while the floating objects are sequentially inserted into the rectangular areas designed to house the floating objects beginning at the head of the floating object list. The result yields an efficient method and system for rendering data into a specific output layout, without requiring batch processing, since as one skilled in the art will appreciate this permits in stream processing with minimal processor utilization.

Figure 1:
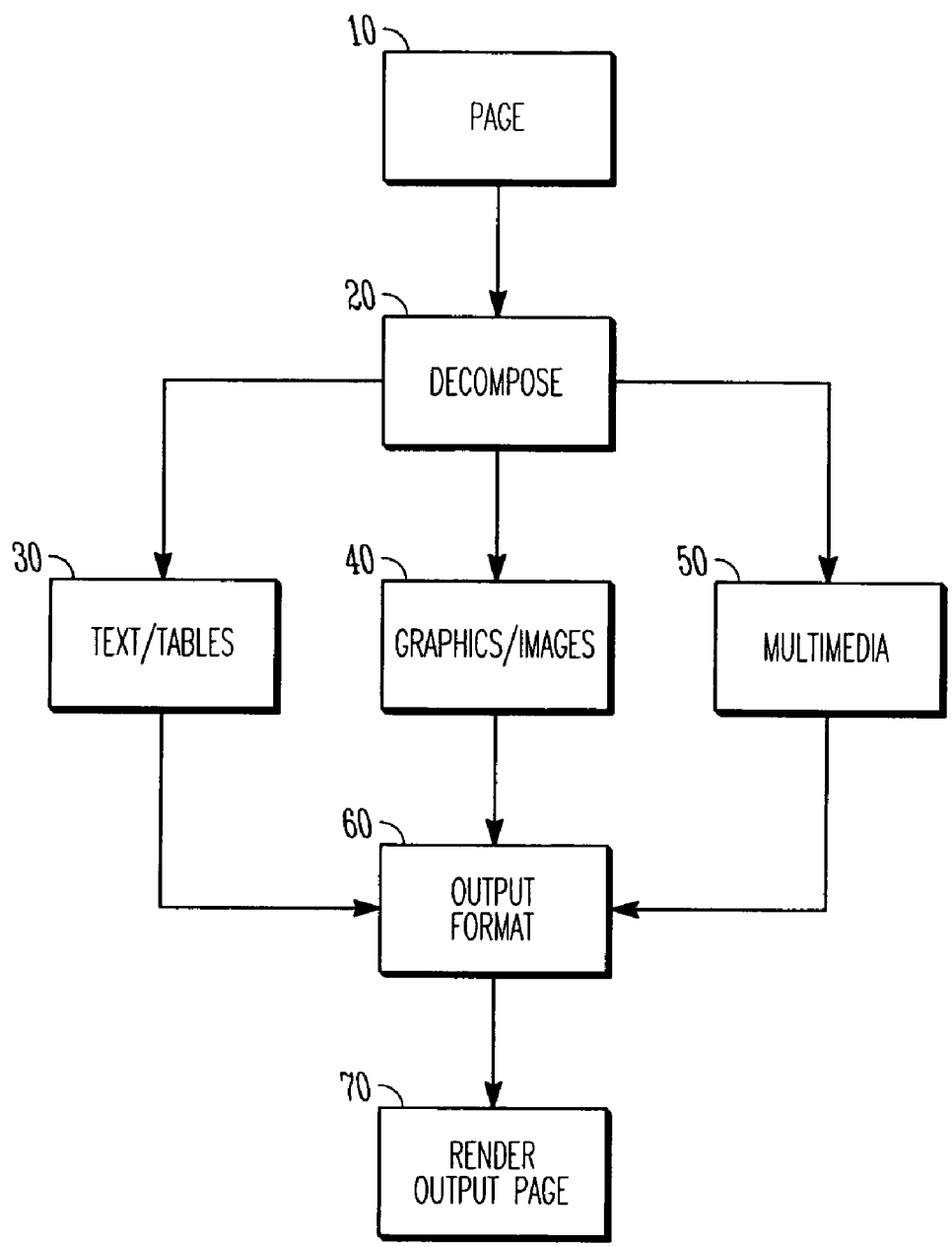
FIG. 1 depicts a flow diagram of a method of rendering data.

FIG. 1 illustrates a flow diagram of one embodiment of a method for rendering data. Initially, data are received in step 10, the data are then decomposed into their constituent data types in step 20. As previously discussed, there are two primary data types, namely text objects and floating objects (non-text objects). Some of these data types are depicted in FIG. 1, such as text/tables 30, graphics/images 40, and multimedia 50. Next, an output format for rendered data is used in step 60 to render these data into an output format desired in step 70.

Figure 2:
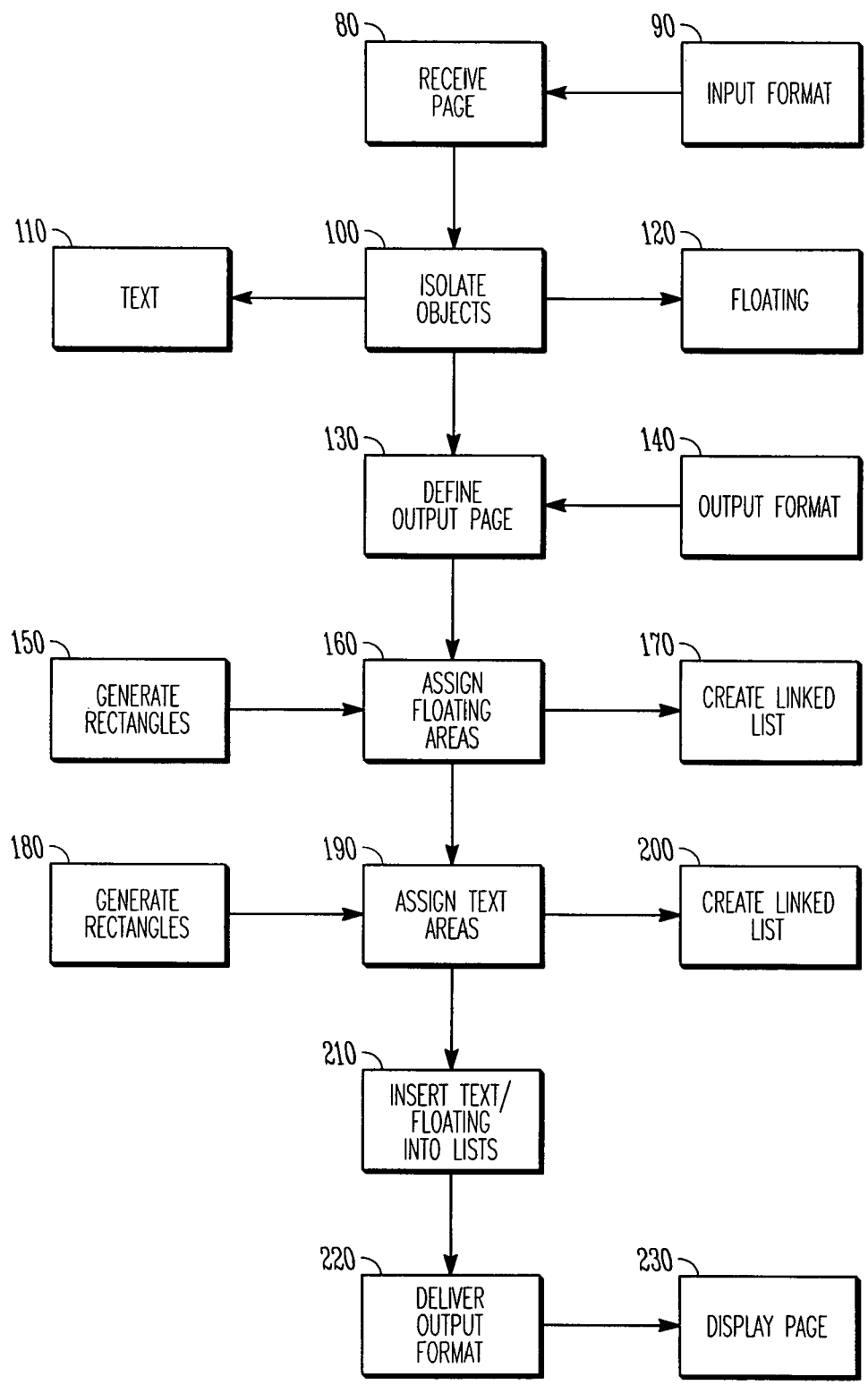
FIG. 2 depicts a flow diagram of a method of rendering data.

FIG. 2 illustrates another flow diagram of one embodiment of a method for rendering electronic data. Initially, electronic data are received in step 80, these data are defined by an input data format in step 90. An exemplary input data format of the present invention is XML. Next, a parser is used to isolate the data types (step 100) contained within the electronic data received. Step 110 isolates all text objects while step 120 isolates all floating objects. Further, a desired rendering of these received data is defined by an output data format of step 140. An exemplary output data format of the present invention is PDF.

In step 130 a formatting operation is performed such that areas are identified in the output format as locations to receive the floating objects. These locations in the output format are defined and reserved in the electronic data to be rendered in step 160. These areas are defined as geometric rectangles in step 150, and each such area is linked together to form a linked list in step 170. The traversal of the linked list defines the floating object path.

Next, the area, in the electronic data to be rendered, which is not reserved by the floating objects are assigned to house the text objects in step 190. Again, the area is segmented into a series of geometric rectangles (step 180) adjacent to the floating object areas, and the text object areas are linked together in a linked list (step 200), the traversal of the linked list defining the text object path.

Finally, the floating objects are inserted sequentially into the floating object list beginning at the head of the floating object list, and the text objects are inserted sequentially into the text object list beginning at the head of the text object list in step 210. In step 220, the original data received are delivered in the desired output format with the desired layout and displayed if necessary in step 230.

By way of example, data initially received in XML format and whose presentation is defined with XSL syntax, are parsed to identify text objects and floating objects, then a desired output format and layout defined by PDF is used to populate the text and floating objects into that desired rendered format. This is done by initially assuming that the output data to render are a single rectangle, and then subtracting from that rectangle a series of linked rectangles which define a linked list, the elements of the list are the rectangles housing the floating objects. The remaining areas in the output data not occupied by the floating objects define a series of rectangles adjacent to the floating objects which are linked together, the elements of this list are the rectangular areas which house the text objects. Finally, the floating objects and the text objects are streamed sequentially into the head of their respective lists to populate the output data which are rendered in PDF.

Figure 3:
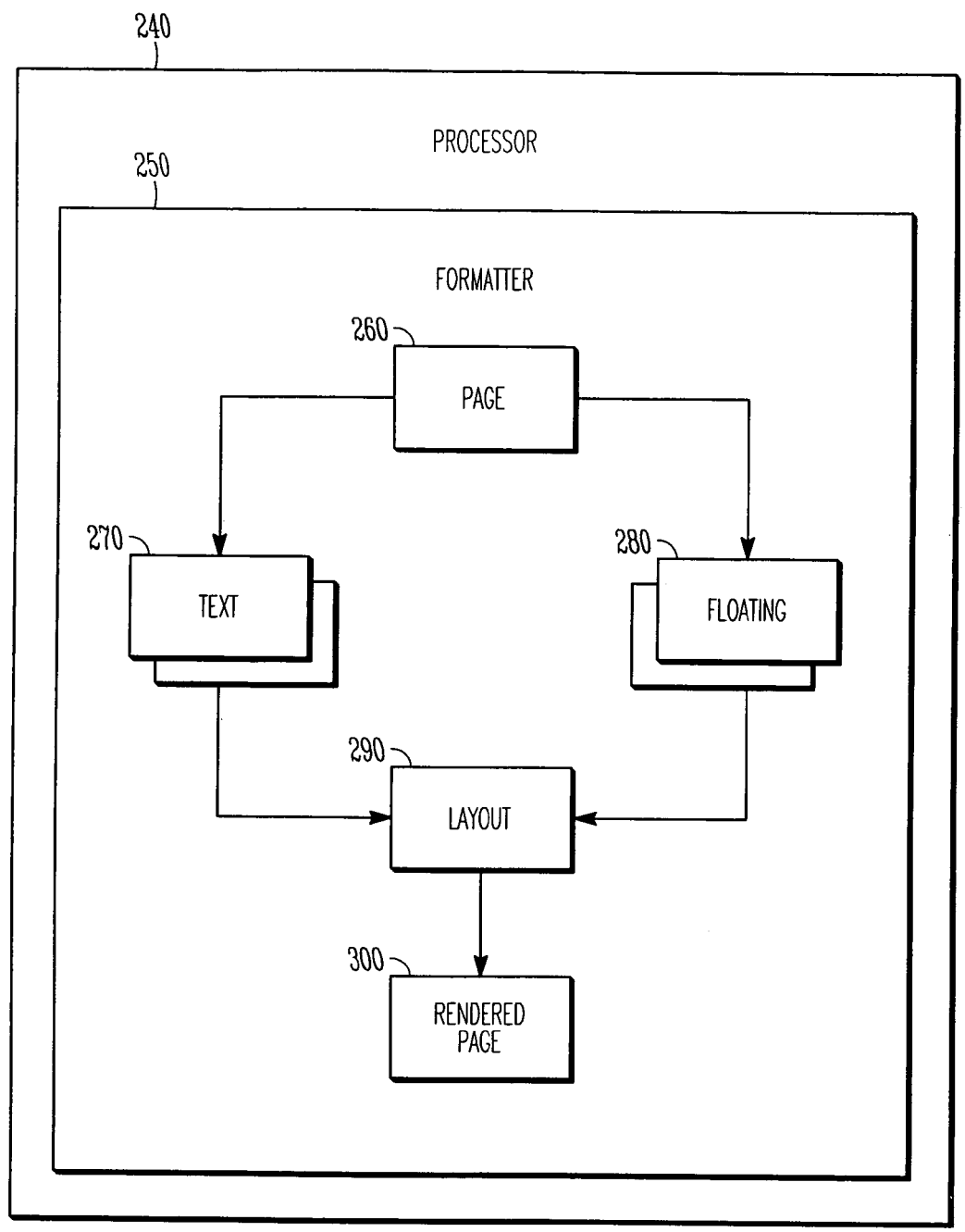
FIG. 3 depicts a diagram of a system of rendering electronic data.

FIG. 3 illustrates a diagram of a system for rendering electronic data. The system of FIG. 3 comprises a processor 240, a formatting software 250, electronic data 260, text objects 270, floating objects 280, a layout data format definition 290, and a rendered electronic data 300. Initially a formatting software 250 is resident on a processor 240, this processor 240 need not be a computer but, rather, any device capable of utilizing a processor.

The formatting software 250 receives electronic data 260, these data are in a defined data format recognized by the formatting software 250, or structured in consistent way such that the formatting software 250 can readily decompose these electronic data 260 into their constituent text objects 270 and floating objects 280. Next, the formatting software 250 generates a series of rectangular areas 290 for the floating objects 280 and for the text objects 270 to produce rendered data 300. Rectangular areas for like objects are linked together to form a linked list and the objects are streamed sequentially into the list beginning at the head of the list.

Figure 4:
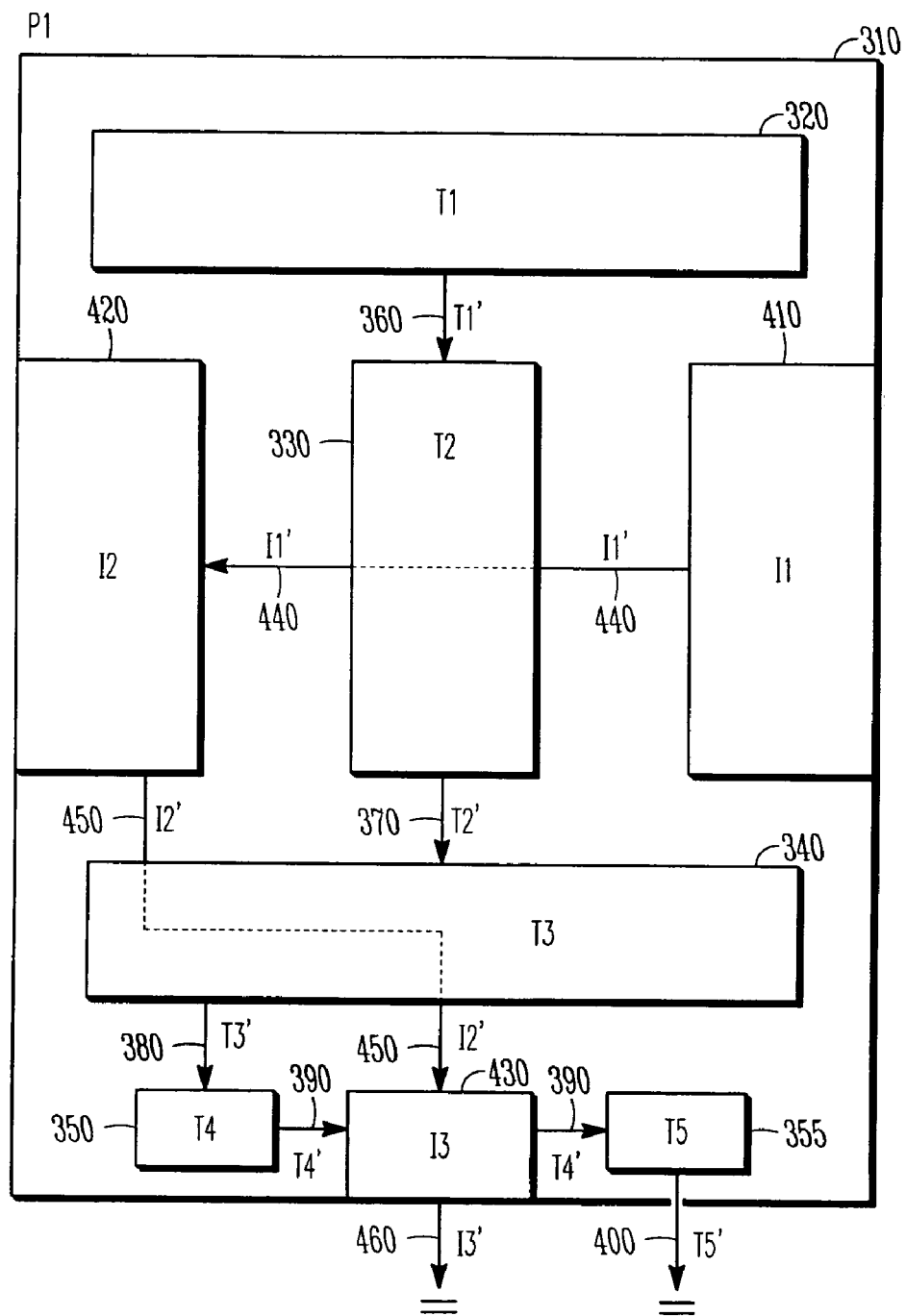
FIG. 4 depicts a block diagram of electronic data.

FIG. 4 illustrates a block diagram of one embodiment for electronic data. FIG. 4 further illustrates the discussion of the prior Figs., namely, rendered electronic data P1 310 are comprised of floating objects (I1 410, I2 420, and I3 430) and text objects (T1 320, T2 330, T3 340, T4 350, and T5 355). Initially P1 310 is a single rectangle, where floating objects are desired to be placed, these floating objects are enclosed in a geometric rectangle shape, which is readily calculated by the floating objects dimensions and placed in the desired locations of data P1 310. These floating object rectangles are linked together to form a linked list identified by the path I1' 440-I2' 450-I3' 460. I1' 440 is the head of the floating object list while I3' 460 is the tail.

After the placement of the floating objects are determined, the text object areas are defined by geometric rectangles which remain in these data and lie adjacent to the floating object rectangles. The series of these rectangles are likewise linked together to form a linked list defined by the path T1' 360-T2' 370-T3' 380-T4' 390-T5' 400. T1' 360 is the head of the text object list while T5' 400 is the tail.

As one skilled in the art will appreciate, these geometric areas are readily ascertainable and calculated by the dimensions of the floating objects and the dimensions of the rendered data. This, therefore, provides a unique and efficient mechanism within which electronic data may be efficiently rendered.

Figure 5:
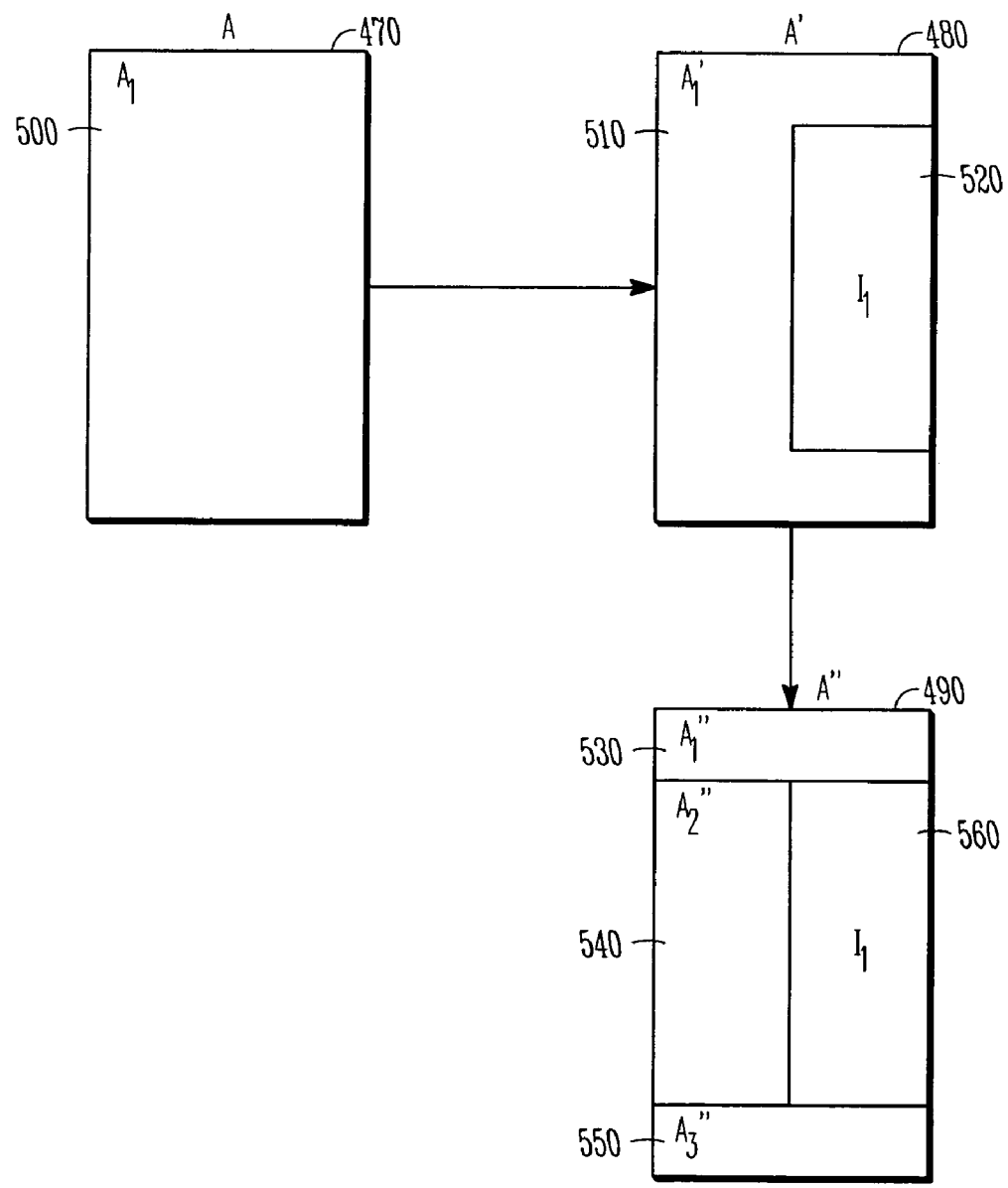
FIG. 5 depicts a transition diagram of rendered electronic data.

FIG. 5 illustrates a transition diagram of one embodiment for rendered electronic data. These data A 470 initially are a single rectangle A1, the area of which is calculated by multiplying the length and the width of the rectangle. If a floating object I1 520, such as an image, is desired in these data, then these data would transition initially to A' 480 including a rectangle I1 520 housing the floating object, and the area A1' 510 representing the remaining area of the initial rectangle A1 500. Once the rectangle I1 520 is subtracted from the initial rectangle A1 500, the rendered data transition to A" 490 where three additional rectangles A1" 530, A2" 540, and A3" 550 are constructed adjacent to rectangle I1 520. These additional rectangles define the area within which the text objects will be placed, and they are linked together so as to form a linked list.

Figure 6:
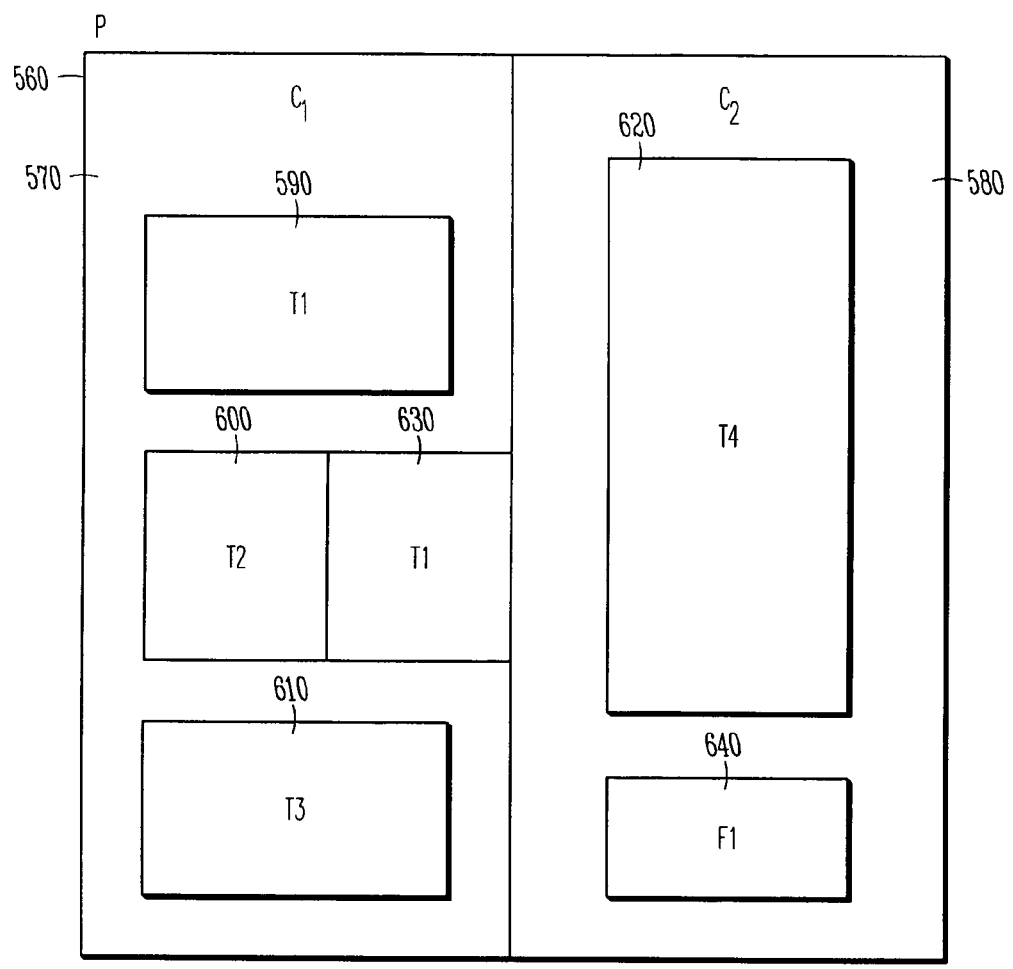
FIG. 6 depicts a block diagram of electronic data.

FIG. 6 illustrates a block diagram of one embodiment for electronic data presentation. In FIG. 6, it is demonstrated how more complex data layouts may be rendered using rectangles to form columns C1 570 and C2 580 in rendered data P 560. As previously discussed, text objects are formed by rectangular areas T1 590, T2 600, T3 610, and T4 620. However, in FIG. 6 higher level objects may be defined by rectangles in the rendered data as well such as columns C1 570 and C2 580. C1 570 includes text objects T1 590, T2 600, T3 610, floating object I1 630, but not text object T4 620 and not floating object F1 640 (indicative of a footnote body), these latter two objects reside in the rectangle defining column C2 580. In this way, rectangles may be used to represent highly complex tables in rendered data or other constructs.

Figure 7:
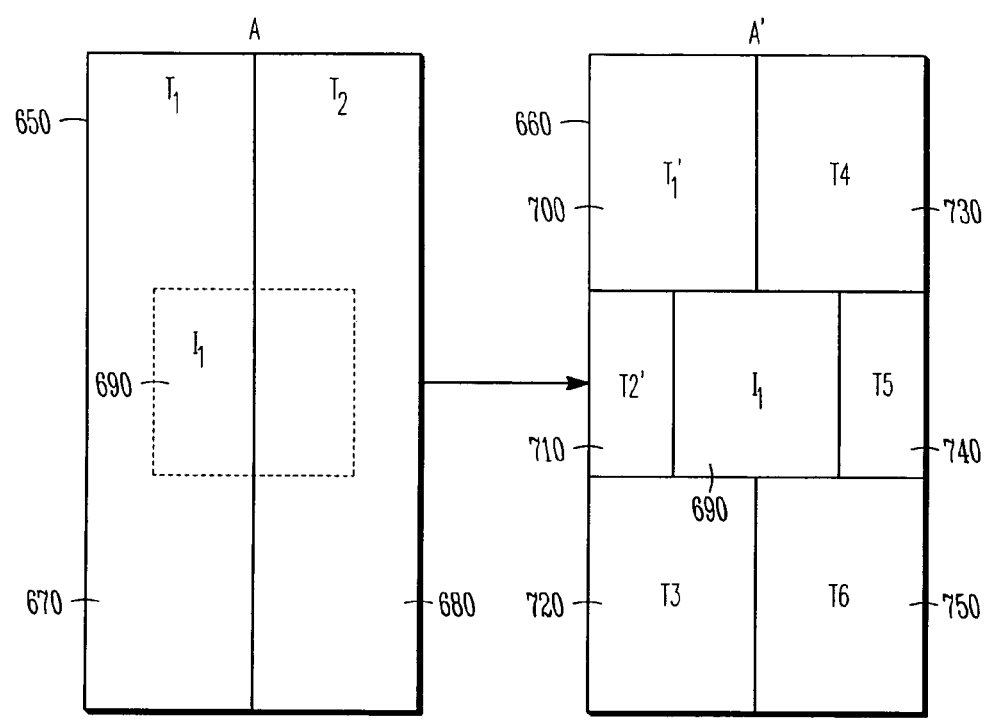
FIG. 7 depicts a transition diagram of rendered electronic data.

FIG. 7 illustrates a transition diagram of one embodiment for rendered electronic data. Electronic data A 650 is initially comprised of text objects T1 670 and T2 680 and it is desired that a floating object I1 690 be placed roughly in the center of data A 650. In accordance with the present invention data A 650 transitions to data A' 660 comprised of 6 text object rectangles T1' 700, T2' 710, T3 720, T4 730, T5 740, T6 750, and the newly inserted floating object I1 690.

Figure 8:
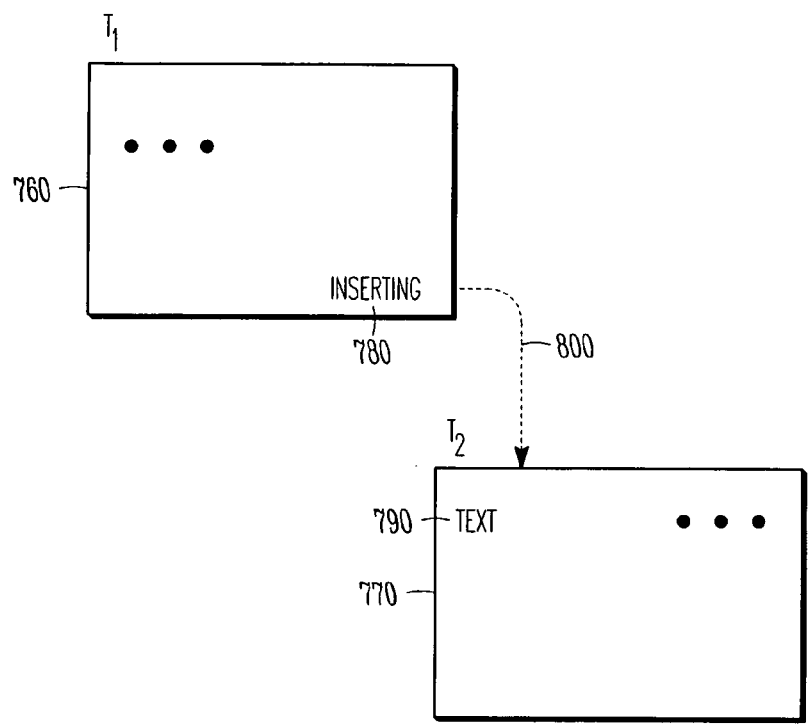
FIG. 8 depicts a diagram of wrapping text.

FIG. 8 illustrates a diagram of one embodiment for wrapping text. As previously indicated, text objects and floating objects are inserted into their respective areas by traversing a linked list which defines the path the objects are to take in the rendered data. In FIG. 8 text rectangle T1 760 contains text object 780 (word "inserting") which is at the very end of the rectangle T1 760, the very next text object 790 (word "text") is placed in the next rectangle T2 770 in the linked list of rectangles which define the text object path. In this way, text objects and floating objects can be sequentially streamed into the rendered data at the appropriate locations.

Figure 9:
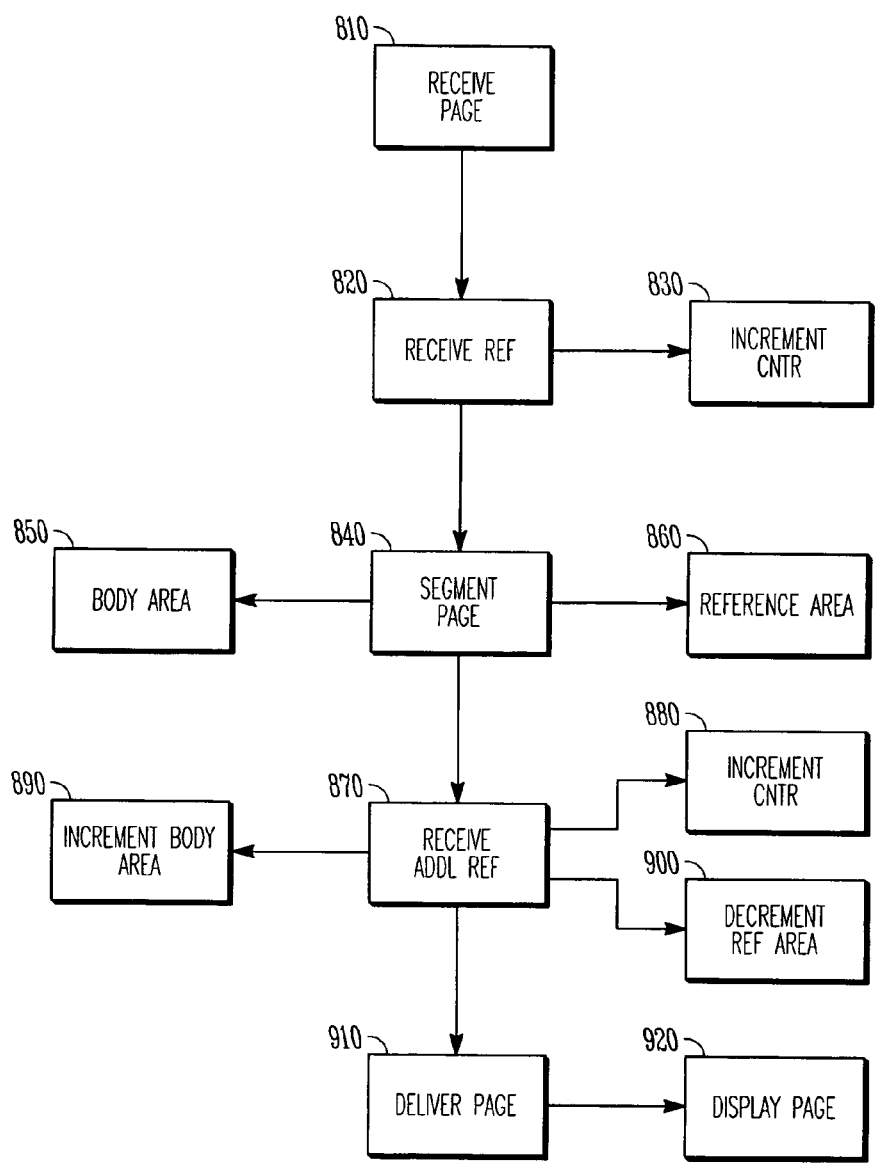
FIG. 9 depicts a flow diagram for rendering footnotes.

FIG. 9 illustrates a flow diagram of one embodiment for rendering footnotes. FIG. 9 further illustrates how a specific subtype of a floating object, namely a footnote body may be processed in accordance with one embodiment of the present invention. Initially, an electronic page is received in step 810, the page, or data, includes a reference to a footnote in step 820. An automatic footnote reference counter is incremented in step 830. The electronic page is segmented in step 840 to generate a body area on the page 850 and a reference area 860. At some later point in time an additional reference to a footnote is received in step 870 requiring a modification to the rendered page. Correspondingly, the counter for the footnote references is incremented in step 880 and the rectangular area defining the body area is incremented to accommodate a new footnote body in step 890 while at the same time, the rectangular area representing the footnote reference area is decremented in step 900. Finally, in step 910 the page is delivered and displayed as necessary in step 920.

Figure 10:
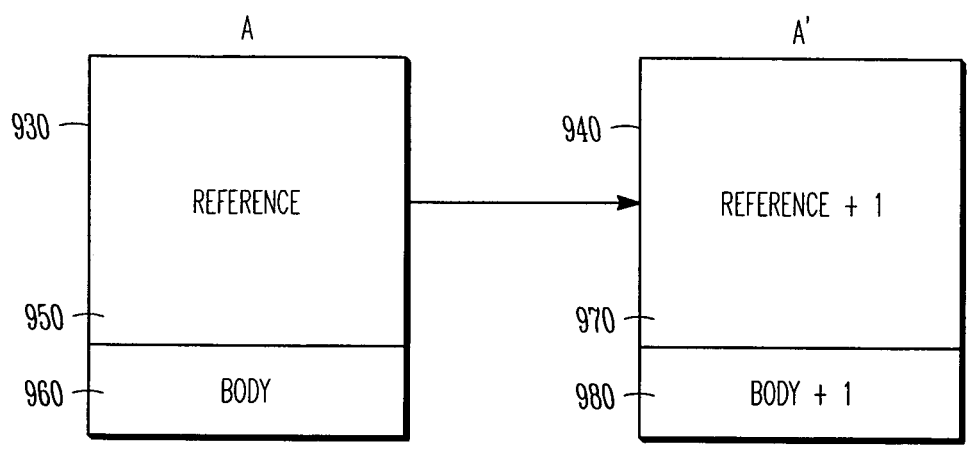
FIG. 10 depicts a transition diagram for rendering footnotes.

FIG. 10 illustrates a transition diagram of one embodiment for rendering footnotes. FIG. 10 graphically illustrates the discussion of FIG. 9 above. Initially the rendered page, or data, A 930 has a defined rectangular area 950 for receiving footnote references and a defined rectangular area 960 for receiving footnote bodies. Once an additional footnote reference is received the rendered page A 930 transitions automatically to state A' 940 where the size of the rectangular area 970 used to house the footnote references is decreased in size as a result of the necessary expansion of the rectangular area 980 used to house the footnote bodies since an additional footnote reference has been inserted into the rendered page A1' 940.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For example, although XML was used as the primary initial data format before data are rendered, any data format which is definable could be used. Moreover, although the primary examples discuss displaying rendered data, data may be rendered for purposes of printing data on a tangible media (e.g. paper, and the like) or delivering data to another application (e.g. fax, additional software modules, intelligent appliances, and the like). Finally, although a web browser (equipped with the appropriate viewing plugins) was used as the primary display mechanism, any display would suffice on any communications device. Accordingly, this invention is intended to embrace all alternatives, modifications, and variations that fall within the spirit and broad scope of the attached claims.

What is claimed is:

1. A system tangibly embodied on a computer readable medium for electronically rendering data on a computer readable medium comprising:
   one or more text objects;
   one or more floating objects; and
   a set of executable instructions operable to create and output data by dividing from input data a set of textual areas and a set of floating areas according to an input data format, wherein the floating areas are subtracted from the input data to acquire the textual areas, and wherein the instructions are operable to populate the textual areas by streaming the text objects into the textual areas and to populate the floating areas by streaming the floating objects into the floating areas, and wherein locations for outputting the textual and floating areas are defined by an output data format and the input data format is different from the output data format, and wherein the textual areas and the floating areas combine to form a page of output media.

2. The system of claim 1, further comprising:
a linking set of executable instructions operable to form a text linked list from the textual areas and a floating linked list from the floating areas.

3. The system of claim 2, further comprising:
   an inserting set of executable instructions operable to insert the text objects sequentially into the text linked list beginning at a text head of the text linked list and operable to insert the floating objects sequentially into the floating linked list beginning at a floating head of the floating linked list.

4. The system of claim 1, wherein the set of executable instructions segments the output data by forming textual geometric rectangles around a space on the output data not occupied by the floating objects and forming floating geometric rectangles around the floating objects, the textual geometric rectangles representing the textual areas and the floating geometric rectangles representing the floating areas.

5. The system of claim 1, further comprising:
   a rendering set of executable instructions operable to define how the output data may be displayed using at least one of a browser, a viewer, a mobile communications device, and a printer.

6. The system of claim 5, wherein the defining is done by tagging the text objects and the floating objects with a markup language.

7. The system of claim 6, wherein the markup language is at least one of extended markup language, extended style sheets language, and portable document format.

8. A method of electronically rendering data on a computer readable medium, comprising:
   receiving one or more text objects and floating objects according to an input data format for an input page of media;
   generating an output page for the input page of media into one or more textual areas for housing the text objects and into floating areas for housing the floating objects, wherein the one or more textual areas are derived by subtracting the floating areas from the output page;
   outputting and converting and streaming the floating objects into the floating areas within the output page according to an output data format, wherein the input data format is different from the output data format;
   outputting and streaming the text objects into the textual areas adjacent to the floating areas and before the floating objects according to the output data format within the output page.

9. The method of claim 8, further comprising:
linking the textual areas creating a linked list of textual areas; and
sequentially inserting the text objects into the linked list starting at a head of the list.

10. The method of claim 8, further comprising:
linking the floating areas creating a linked list of floating areas; and
sequentially inserting the floating objects into the linked list starting at a head of the list.

11. The method of claim 8, wherein the floating areas and the textual areas are generated by forming geometric rectangles.

12. The method of claim 8, further comprising:
displaying the outputted floating areas and textual areas within a viewer.

13. A method of electronically providing for a footnote body on a page, comprising:
   receiving one or more page objects including reference objects and body objects according to an input data format;
   generating a body area located at the bottom of a page to house the body objects according to an output data format, and wherein the input data format is different from the output data format;

generating a reference area located above the body area to house the reference objects according to the output data format;

forming a reference geometric rectangle representing the reference area and a body geometric rectangle representing the body area according to the output data format; and automatically expanding an area of the body geometric rectangle to accommodate an additional body object while decreasing a second area of the reference area maintaining an overall area associated with the page.

14. The method of claim 13, further comprising:

displaying the reference geometric rectangle area and the body geometric rectangle area in a browser.

15. The method of claim 13, further comprising:

delivering the page including the reference geometric rectangle area and the body geometric rectangle area to at least one of a browser and a printer in a markup language defining the page.

16. The method of claim 15, wherein the markup language is at least one of extended markup language, extended style sheets language, and portable document format.

17. The method of claim 15, wherein the delivering the page occurs as reference objects and body objects are piped to a set of executable instructions operable to insert the markup language representing a displayed page.

18. The method of claim 13, further comprising:

associating automatically a reference counter to the reference object.

19. The method of claim 18, wherein the reference counter is automatically incremented with each new reference object.

* * * * *

UNITED STATES PATENT AND TRADEMARK OFFICE
CERTIFICATE OF CORRECTION

| | |
|---|---|
| PATENT NO. | : 7,024,621 B1 |
| APPLICATION NO. | : 09/699806 |
| DATED | : April 4, 2006 |
| INVENTOR(S) | : Tolpin |

It is certified that error appears in the above-identified patent and that said Letters Patent is hereby corrected as shown below:

On the Title page, item (56), under "U.S. Patent Documents", in column 1, line 9, after "Murata" insert - - et al. - -.

On the Title page, item (56), under "Foreign Patent Documents", in column 2, line 1, after "11/1983" insert - - G06F/15/20 - -.

On the Title page, item (57), under "Abstract", in column 2, line 17, after "reference" delete "are" and insert - - area - -, therefor.

On page 2, item (56), under "Foreign Patent Documents", in column 2, line 1 , after "11/1990" insert - - G06F/15/20 - -.

Signed and Sealed this

Eighth Day of August, 2006

JON W. DUDAS
*Director of the United States Patent and Trademark Office*